J. LAUS, Jr.
AUTOMOBILE WHEEL.
APPLICATION FILED APR. 21, 1913.
1,118,785.
Patented Nov. 24, 1914.
3 SHEETS—SHEET 1.
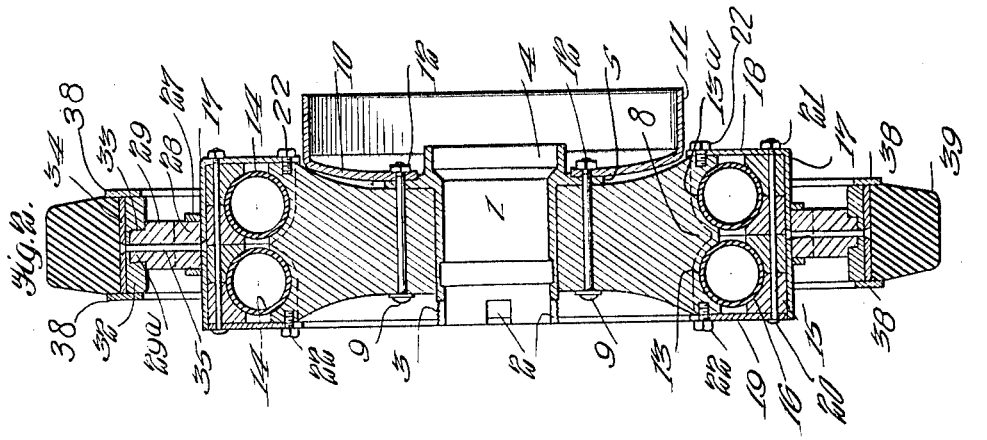
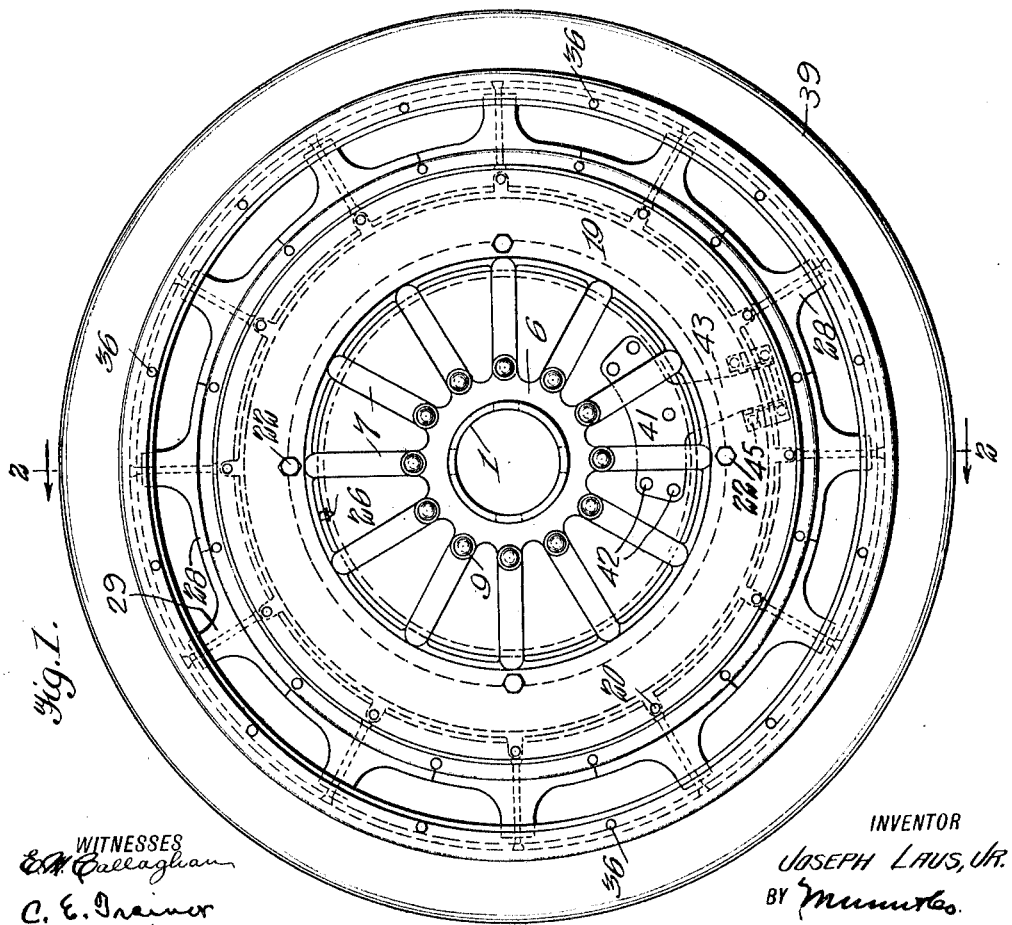
WITNESSES
INVENTOR
JOSEPH LAUS, JR.
BY
ATTORNEYS

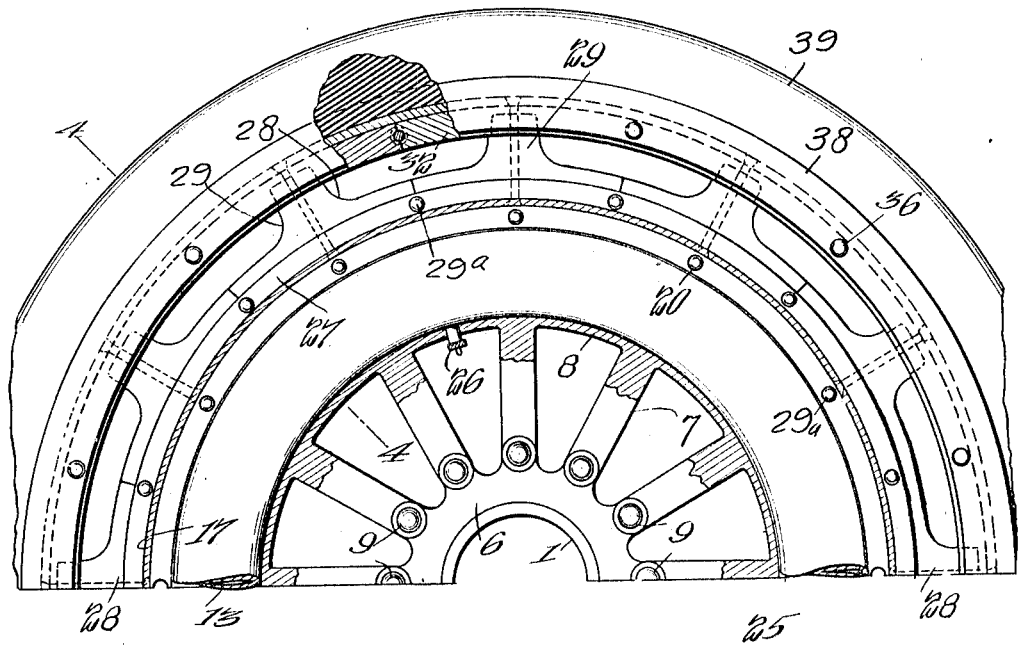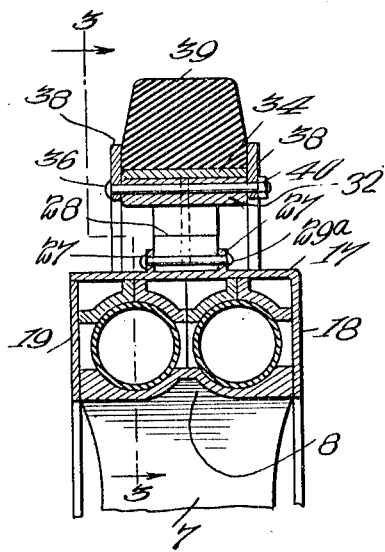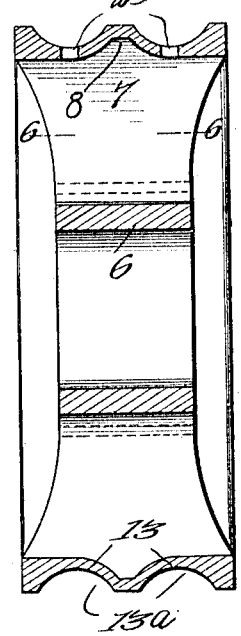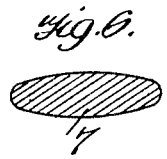

J. LAUS, Jr.
AUTOMOBILE WHEEL.
APPLICATION FILED APR. 21, 1913.
1,118,785.
Patented Nov. 24, 1914.
3 SHEETS—SHEET 3.
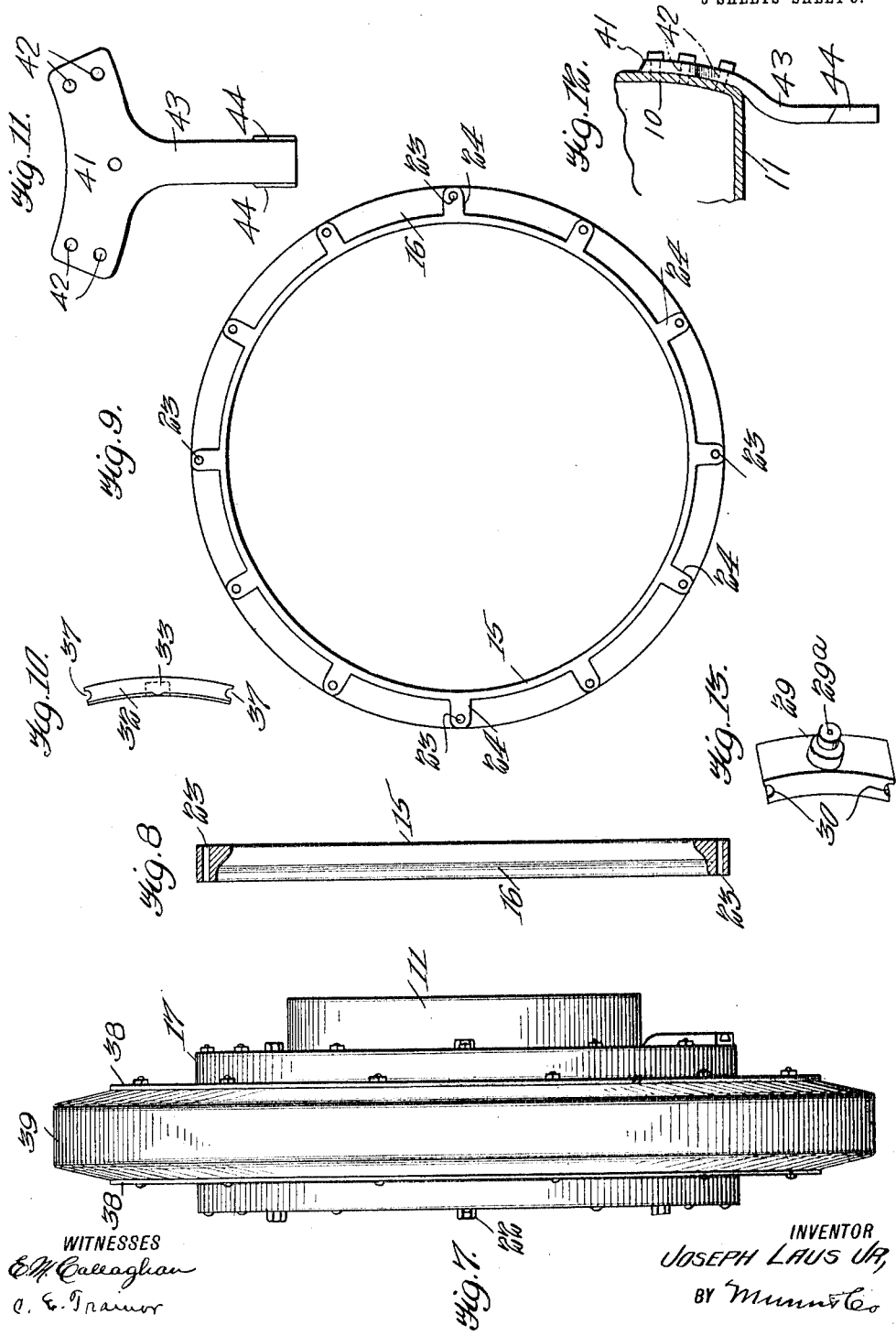
WITNESSES
E. M. Callaghan
C. E. Trainor
INVENTOR
JOSEPH LAUS JR,
BY Munn & Co
ATTORNEYS

UNITED STATES PATENT OFFICE.

JOSEPH LAUS, JR., OF OSHKOSH, WISCONSIN.

AUTOMOBILE-WHEEL.

1,118,785.   Specification of Letters Patent.   Patented Nov. 24, 1914.

Application filed April 21, 1913. Serial No. 762,543.

*To all whom it may concern:*

Be it known that I, JOSEPH LAUS, Jr., a citizen of the United States, and a resident of Oshkosh, in the county of Winnebago and State of Wisconsin, have invented a new and useful Improvement in Automobile-Wheels, of which the following is a specification.

My invention is an improvement in automobile wheels, and has for its object to provide a wheel of the character specified, wherein pneumatic tires are made use of to cushion shock and jar between the vehicle and the ground, so arranged that while the full efficiency of the resiliency of the tires is utilized, yet the said tires are protected from external injury and from contact with the ground.

In the drawings: Figure 1 is a side view of the improved wheel, Fig. 2 is a section on the line 2—2 of Fig. 1, Fig. 3 is a section on the line 3—3 of Fig. 4, Fig. 4 is a section on the line 4—4 of Fig. 3, Fig. 5 is a section through the inner wheel, Fig. 6 is a section on the line 6—6 of Fig. 5, Fig. 7 is an edge view of the improved wheel, Fig. 8 is a sectional view of one of the grooved rings, Fig. 9 is a side view of the same, Fig. 10 is a side view of one of the sections of the wooden rim, Fig. 11 is a side view of the connection between the inner wheel and the rim, Fig. 12 is a partial section of the wheel at the said connection, and Fig. 13 is a perspective view of one of the filling blocks.

The present embodiment of the invention comprises a central or inner wheel consisting of a bushing 1 of metal or the like, the said bushing having one of its ends provided with spaced notches or recesses 2, and being externally threaded at the said end for a distance corresponding to the length of the notches as indicated at 3, and the opposite end of the wheel is offset outwardly or enlarged annularly as indicated at 4, and the bushing is provided with an annular radial flange 5 at the junction of the enlarged portion with the body of the hub.

An inner wheel is seated on the bushing, the said wheel comprising a hub 6, inclosing the bushing, and spokes 7 extending radially from the hub and connecting the hub to a rim 8. The inner wheel is preferably of wood as shown, and each of the spokes is secured to the flange 5 by means of bolts 9, the said bolts passing through the spokes and the flange, and also through the web 10 of a ring 11, and each bolt is engaged by a nut 12, to secure the parts in place.

The rim 8 is provided with two annular grooves 13 and 13$^a$ respectively, the said grooves being alongside each other, and each groove is adapted to receive a pneumatic tire 14. An outer rim is provided, the said rim consisting of a plurality of pairs of rings 15, each of the said rings being beveled at one of its inner edges as indicated at 16, and the beveled portions coöperate to form a groove for engaging the periphery of the adjacent tire.

The peripheries of the rings 15 are flush, and a housing ring 17 encircles the said rings 15. The housing ring is provided at one side edge with an inwardly extending flange or cheek plate 18, and at the opposite side edge a similar separable cheek plate 19 is provided. The cheek plates 18 and 19 fit against the outer faces of the outermost rings 15 and against the outer edges of the rim 8, and bolts 20 are passed through the cheek plates and the rings 15 to secure the cheek plates in place, each bolt being engaged by a nut 21.

Screws 22 are provided for emergency uses for connecting the cheek plates to the rim of the inner wheel, the said screws being passed through openings in the cheek plates and engaging the rim. The screws 22 are used only when a solid wheel construction is desired, as for instance, in cases where the pneumatic tires are punctured or injured, and can no longer support the weight of the vehicle. In such case, the screws 22 are inserted to rigidly connect the outer wheel with the inner wheel. The cheek plate 18 is of somewhat greater diameter than the ring 11, to permit the relative movement of the cheek plate with respect to the ring.

The rings 15 as indicated in Fig. 4, are cut away at their outer corners, for the sake of lightness between the bolts 20. This construction is more clearly shown in Figs. 8 and 9, and it will be noticed that at each opening 23 for a bolt 20 the ring is of uniform width, thus forming spaced radial abutments or buttresses as indicated at 24. The rim 8 of the inner wheel is provided with radial openings 25 (Fig. 5) for permitting the passage of the inflating valves 26 (Fig. 3) to permit the pneumatic tires to be inflated.

The housing ring 17 is provided with spaced annular radial flanges 27, on each side of its central plane, and filling blocks 28 are arranged between the flanges, and are secured to the flanges by means of rivets 29ª. Each of the filling blocks 28 as shown in Figs. 1 and 3 is provided intermediate its ends on its outer face with a radial extension 29, and each extension has a cylindrical or rounded lug 29ª, and the inner face of each of the said blocks is arc-shaped or curved to fit the peripheral surface of the housing ring 17, and the ends of the blocks abut against each other as shown.

The rivets 29 before mentioned, are arranged between the ends of the blocks, each end of each block being recessed at 30 to receive the said rim as shown more particularly in Fig. 13. The filling blocks 28 form a continuous annular structure, and a rim encircles the wheel outside of the said blocks, the said rim being formed of sections 32 of wood or the like, each curved to form a ring when the ends of the sections are placed in abutting relation, and each of the said sections is provided on its inner face at the center thereof with a recess 33 for receiving the lug 29ª of the adjacent filling block.

A metal rim 34 encircles the wooden sectional rim, and rivets 35 are passed radially through the metal rim 34, the sectional rim 32, and the housing ring 17, binding the parts together. Bolts 36 (to be presently described) are passed transversely of the wooden rim between the meeting ends of the section, each end of each of the sections being recessed as indicated at 37 in Fig. 10 for receiving the rivets.

Housing rings 38 are arranged on each side of the metal rim 34, the said housing rings extending on both sides of the said metal rim, and a solid rubber tire 39 is seated on the metal rim between the outer edges of the housing rings. The sectional wooden rim is between the inner edges of the said housing rings and the bolts 36 pass through the housing rings to hold them in place, each bolt being engaged by a nut 40.

The inner wheel consisting of the hub 6, the spokes 7 and the rim 8 is movable radially with respect to the outer rim, consisting of the housing 17—18—19 and connected parts, and mechanism is provided for permitting this radial movement while constraining the said inner wheel and the rim to rotate together. The said mechanism comprises a yoke consisting of a body 41, provided with openings 42 for receiving a securing means, and an arm 43, the said arm having at its free end and at each side thereof an extension 44. The body 41 of the yoke is secured to the web 10 of the ring 11 on the inner wheel by bolts or screws 46, and the extensions 44 of the arm 43 fit slidably a guide bracket 45, secured to the rim. The extensions 44 of the yoke arm fit the guide loosely, to permit the necessary angular movement between the inner and the outer wheels.

The said arm is slidable in the guide bracket, but constrains the rim and the inner wheel to rotate together. The spokes 7 are preferably of elliptical cross section as indicated in Fig. 6, and the said inner wheel is of wood or like suitable material, with the exception of the bushing. The improved wheel may be considered as an inner wheel and an outer annular frame or ring, and cushioning mechanism arranged between the inner wheel and the ring or frame for cushioning the said inner wheel against jar and shock. Since the inner wheel is movable radially with respect to the outer ring or frame, the pneumatic tires absorb and cushion all jar and the like, while at the same time the said tires are perfectly protected from external injuries. It will be noted from an inspection of Fig. 2 that the inner wheel is separated from the annular frame or ring by sufficient space to permit a considerable movement between the parts.

I claim:—

A wheel of the character specified, comprising an integral inner wheel having annular grooves on its periphery lying alongside each other, pneumatic tires in the grooves, and an annular frame encircling the tires and engaging the outer faces thereof, said annular frame comprising a pair of rings for each tire, means for securing the rings together, and a tread member connected with the rings and spaced apart outwardly therefrom, and a solid tire carried by the tread member, the connection between the rings comprising housing plates, one of the said plates being angular and comprising a portion fitting the outer faces of the rings, and a portion extending inwardly therefrom and lying alongside the adjacent face of the inner wheel, the other plate having a ring lying alongside the opposite face of the inner wheel, and a driving connection between the wheel and the frame.

JOSEPH LAUS, Jr.

Witnesses:
F. A. LABUDDE,
J. P. FITCH.